United States Patent

[11] 3,582,665

| | | |
|---|---|---|
| [72] | Inventor | Edward F. Prozeller<br>Silver Spring, Md. |
| [21] | Appl. No. | 753,259 |
| [22] | Filed | Aug. 16, 1968 |
| [45] | Patented | June 1, 1971 |
| [73] | Assignee | The United States of America as represented by the Secretary of the Navy |

[54] LATCHING THRESHOLD DETECTOR
8 Claims, 2 Drawing Figs.

[52] U.S. Cl. ................................................ 307/235,
307/236, 307/255, 307/288
[51] Int. Cl. ................................................ H03k 5/20,
H03k 3/26
[50] Field of Search .......................................... 307/235,
236, 255, 261, 288, 313; 328/115, 118, 146, 31

[56] References Cited
UNITED STATES PATENTS

| 3,225,218 | 12/1965 | Cochran | 307/235X |
| 3,292,098 | 12/1966 | Bensing | 307/235X |
| 3,319,086 | 5/1967 | Yee | 307/288 |
| 3,348,068 | 10/1967 | Miller | 307/288X |

Primary Examiner—Stanley D. Miller, Jr.
Attorneys—R. S. Sciascia and J. A. Cooke ABSTRACT: A trigger circuit for providing an output signal in response to an input signal only when said input signal meets a predetermined set of requirements. An input signal is fed, in parallel, to two class A emitter followers. Each emitter follower is associated with a respective dual-transistor circuit, one circuit effecting the positive trigger level and the other effecting the negative trigger level. The trigger levels depend solely on the emitter-to-base voltage required to turn on the controlling transistors and therefore the trigger levels are independent of variations in the supply voltage. In one embodiment, the instant circuit serves as a zero-crossing detector; and in another embodiment it serves as a general amplitude detecting circuit.

EDWARD F. PROZELLER
INVENTOR

LATCHING THRESHOLD DETECTOR

BACKGROUND OF THE INVENTION

1. Field of the Invention

The present invention relates to a trigger circuit whereby an alternating current input wave having a sinusoidal wave shape is converted to an alternating current output wave of the square wave variety. The trigger levels of the instant circuit are independent of variations in the supply voltage and of circuit component tolerances.

2. Description of the Prior Art

The most commonly used trigger circuit is the familiar Schmitt trigger. The Schmitt trigger circuit consists of a differential amplifier with positive feedback for establishing the trigger levels. However, there are two noteworthy drawbacks attendant in the Schmitt trigger circuit. First, the trigger levels are inherently dependent upon variations in the supply voltage; and second, the trigger levels are dependent, to a large extent, upon component tolerances.

SUMMARY OF THE INVENTION

The subject invention relates to a transistor circuit which is capable of issuing a response to an input signal only when said input signal meets a predetermined set of requirements. The trigger levels of said circuit are independent of fluctuations in the supply voltage and of circuit component tolerances. The input circuit consists of a pair of parallelly fed class A emitter follower amplifiers which serve to provide a high input impedance and which further serve to counterbalance any transistor-junction voltage drop encountered in the remaining portions of the circuit. One of the emitter follower amplifiers feeds a first dual-transistor circuit which effects the positive trigger level of the circuit; and the other emitter follower amplifier feeds a second dual-transistor circuit which effects the negative trigger level.

When the input signal is of a positive polarity, the first dual-transistor circuit receives the biasing necessary to cause all transistors in said circuit to become conductive. This dual-transistor circuit latches on and causes the output voltages to go from a positive value to zero. The trigger level of the first dual-transistor circuit is dependent only upon the emitter-to-base voltage of one of its transistors and therefore the positive trigger level is substantially independent of variations in the supply voltage and can be precisely controlled.

When the input signal is of a negative polarity, the second dual-transistor circuit receives the biasing necessary to cause all transistors in said circuit to become conductive. Upon receipt of this biasing, the transistors in the second dual-transistor circuit extract current from the first dual-transistor circuit causing the transistors in said first circuit to become nonconductive. The state of the transistors in the second dual-transistor circuit depends solely upon the emitter-to-base voltage of one of its transistors and therefore the state of said second circuit is substantially independent of variations in the supply voltage.

The first and second dual-transistor circuits are interconnected in such a manner that when the transistors in one circuit are conductive the transistors in the other circuit are nonconductive; and therefore, both the positive and the negative trigger levels can be precisely controlled.

It is therefore an object of the invention to provide a trigger circuit whose trigger levels are independent of variations in the supply voltage.

It is another object of the invention to provide a trigger circuit having a high input impedance and having trigger levels independent of variations in the supply voltage.

It is a further object of the invention to provide a trigger circuit whose trigger levels are independent of variations in the supply voltage and whose component tolerances are noncritical.

It is still another object of the invention to provide a trigger circuit having precisely defined and easily controlled trigger levels.

It is yet a further object of the invention to provide a circuit which is capable of converting a sinusoidal wave input into a square wave output in such a manner that the trigger levels are independent of fluctuations in the supply voltage.

It is still a further object of the invention to provide an uncomplicated zero-crossing detector circuit.

It is yet another object of the invention to provide a detector circuit for accurately indicating the presence of input signals greater than a predetermined amplitude level.

These and other objects of the invention will become more readily apparent when reference is made to the following description taken in conjunction with the accompanying drawings.

DETAILED DESCRIPTION OF THE PREFERRED EMBODIMENTS

Figures 1, 2:
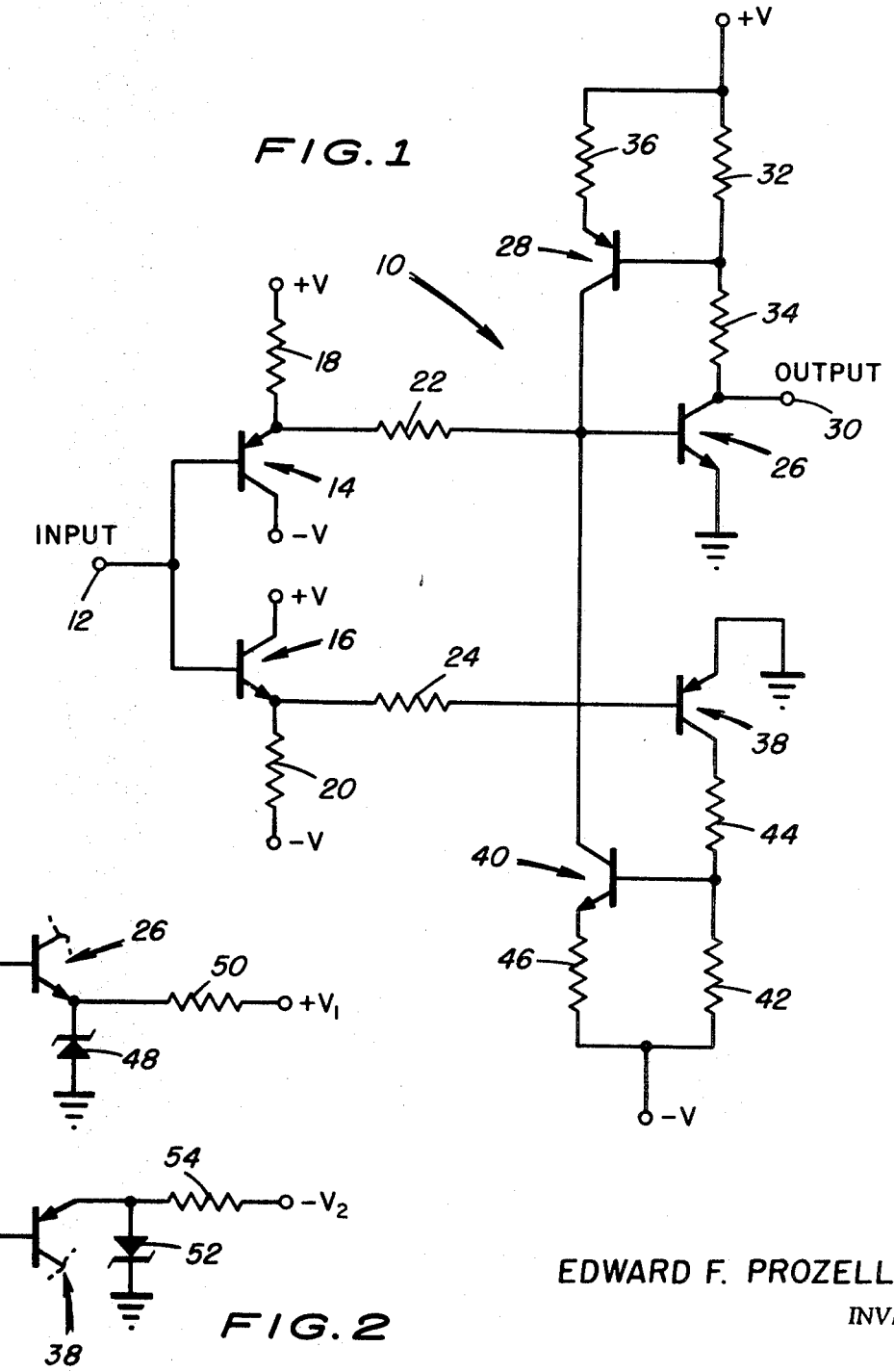
In FIG. 1 there is shown one embodiment of the trigger circuit of the present invention; and In FIG. 2 there is shown an alternate embodiment of a portion of the circuit shown in FIG. 1.

With reference now to the drawings, there will first be given a detailed description of the physical configuration of the circuit of the subject invention, there following a detailed description of the operation of said circuit.

In FIG. 1, the trigger circuit of the subject invention is shown generally at 10. An input signal is impressed upon the circuit 10 at an input terminal 12 and is fed, in parallel, to a pair of input transistors 14 and 16, respectively. The input transistor 14 is of the PNP variety and has its collector junction biased by a source of negative potential −V and has its emitter biased by a source of positive potential +V through a biasing resistor 18; and the input transistor 16 is of the NPN variety and has its collector junction biased by a source of positive potential +V and has its emitter junction biased by a source of negative potential −V through a biasing resistor 20. Connected directly to the emitter junction of the input transistor 14 is an input resistor 22; and connected directly to the emitter junction of the input transistor 16 is a second input resistor 24.

Associated with the input transistor 14, and receiving signals therefrom (through the input resistor 22), is a first dual-transistor circuit comprising a pair of transistors 26 and 28, respectively. The base of transistor 26 is connected to the input resistor 22; the emitter of transistor 26 is connected directly to ground; and the collector of transistor 26 forms a junction 30 which serves as the output terminal for the trigger circuit 10. The collector junction of transistor 26 is biased by a source of positive potential +V acting through a pair of biasing resistors 32 and 34. The base of transistor 28 is biased by a source of positive potential +V through the biasing resistor 32; the collector of transistor 28 is connected to the base of transistor 26 and therefore to the input resistor 22; and the emitter of transistor 28 is biased by a source of positive potential +V through a biasing resistor 36.

Associated with the input transistor 16, and receiving signals therefrom (through the input resistor 24), is a second dual-transistor circuit comprising transistors 38 and 40, respectively. The base of transistor 38 is connected to the input resistor 24; the emitter of transistor 38 is connected directly to ground; and the collector of transistor 38 is biased by a source of negative potential −V acting through a pair of biasing resistors 42 and 44. The base of transistor 40 is biased by a source of negative potential −V through the biasing resistor 42; the emitter of transistor 40 is biased by a source of negative potential −V acting through a biasing resistor 46; and the collector of transistor 40 is connected to the base of transistor 26, the collector of transistor 28, and the input resistor 22.

While the input to the trigger circuit 10 could be any type of signal, including random noise, the operation of the circuit will be explained with reference to a sinusoidal input signal. But before undertaking a detailed description of the circuit operation, some preliminary comments regarding the state of the transistors are thought timely. Transistors 14 and 16 are connected as emitter followers operating as class A amplifiers; therefore with any signal impressed upon the input terminal 12, within the dynamic range of the circuit (−V to +V), both transistors 14 and 16 will be in their conductive states. The NPN transistor 26 is normally off and is in its conductive state only when there is provided a source of base current via either resistor 22 or transistor 28. The PNP transistor 28 is connected into the circuit in such a manner that it is in its conductive state when current flows through the transistor 26—transistor 28 remaining nonconductive at all other times. The PNP transistor 38 is connected into the circuit in such a manner that it conducts only when there is provided a source of base current via resistor 24. An NPN transistor 40 is biased so that it conducts only when transistor 38 is in its conductive state. It should also be noted that the conduction states hereinabove discussed are exemplary only. The circuit could operate equally well with all conduction states reversed.

In operation, a sine wave input signal is impressed upon the input terminal 12 and is fed to the respective bases of the input transistors 14 and 16. First, it will be assumed that the sine wave input signal is in its positive-going region. When the positive signal is impressed upon the base of the PNP input transistor 14, transistor 14 becomes less conductive, less current flows through resistor 18, and therefore the emitter of transistor 14 becomes more positive. When the voltage on the emitter of transistor 14 reaches one emitter-to-base junction voltage drop, transistor 26 has sufficient bias to switch to its conductive state. When transistor 26 is conductive the voltage at the base of transistor 28 decreases in value and thereby causes transistor 28 to switch to its conductive state. When transistor 28 conducts, current flows from the collector of transistor 28 into the base of transistor 26, completely saturating transistor 26. When transistor 26 is saturated the output signal appearing at the output terminal 30 decreases from +V volts to zero volts.

It is stated above that transistor 26 switches to its conductive state when the voltage on its base reaches one emitter-to-base voltage drop. This condition exists when the voltage appearing at the input terminal 12 is zero volts since the voltage on the emitter of transistor 14 is always more positive than the voltage on the input terminal 12 by an amount equal to one emitter-to-base voltage drop. It can therefore be said that transistor 14 compensates for the emitter-to-base voltage drop associated with transistor 26, the result being that the positive trigger level of the circuit shown in FIG. 1 is at zero volts.

It should here be noted that there exists a feedback path between the collector of transistor 28 and the base of transistor 26. When a positive input signal places transistor 26 in its conductive state and transistor 26 in turn places transistor 28 in its conductive state, the feedback path is completed. Once the collector of transistor 28 begins feeding current to the base of transistor 26, transistor 26 becomes latched on and therefore the removal of the input signal does not, by itself, cause transistor 26 to switch over to its nonconductive state.

The positive voltage appearing at the base of transistor 14 also appears at the base of the input transistor 16. In response to this positive voltage, input transistor 16 becomes highly conductive and causes a positive biasing potential to appear at the base of transistor 38. In response to the positive voltage on its base, transistor 38 remains in its nonconductive state. With transister 38 nonconductive, there appears a large negative potential at the base of transistor 40 (from −V) making transistor 40 nonconductive. Therefore, when the signal impressed upon the input terminal 12 is of a positive voltage the output signal appearing at terminal 30 is forced down to zero volts.

Before continuing, it should once again be noted that transistors 26 and 28 do not turn off immediately after the removal of the positive voltage from the base of transistor 26. Instead, there is a latching effect associated with transistors 26 and 28. To rapidly turn off this feedback circuit, it is therefore necessary that additional circuitry be provided—this additional circuitry is found in the circuit comprising transistors 38 and 40.

Assuming now that the sinusoidal input wave is operating in its negative-going region, the description of the circuit operation continues. The negative signal appearing at the base of input transistor 14 causes said input transistor to become highly conductive, thereby causing the voltage at the emitter of transistor 14 to decrease. Transistor 26 remains conductive, however, since it is being provided base current by the collector of transistor 28. Transistor 26 is latched on.

The negative voltage impressed upon the base of transistor 16 causes said transistor to be only slightly conductive thereby resulting in a negative bias reaching the base of transistor 38. In response to the negative bias on its base, transistor 38 becomes conductive. While transistor 38 conducts, the voltage at the base of transistor 40 becomes more positive and transistor 40 turns on. Since the collector of transistor 40 is connected to the collector of transistor 28 and since transistor 40 is in its conductive state, transistor 40 tends to draw current from the collector of transistor 28 and therefore draws current away from the base of transistor 26. Put another way, when transistor 40 is in its conductive state, it overrides and destroys the feedback path which feeds current to the base of transistor 26. Without base current, transistor 26 rapidly goes nonconductive.

In summary, when a positive input signal is applied to the input terminal 12 of the trigger circuit 10, transistor 26 becomes conductive and the output appearing at terminal 30 goes from +V volts to zero volts. And when the input signal impressed upon the input terminal 12 is of a negative potential, transistors 38 and 40 become conductive thereby drawing circuit current away from the base of transistor 26, turning off transistor 26 and causing the output voltage appearing at terminal 30 to go from zero volts to +V volts.

Since the above-described circuit switches from one state to another when the input signal crosses the zero-volt axis, the circuit is particularly useful as a zero-crossing detector circuit. Also, since the voltage appearing at the output terminal 30 sharply alternates between +V volts and zero volts, resulting in a square wave output, it can be said that the trigger circuit 10 is particularly useful in converting an input sinusoidal wave into an output square wave. It should be remembered that since the triggering levels are dependent only upon the difference in the emitter-to-base voltages necessary to turn on transistors 26 and 38 and the emitter-to-base voltages associated with transistors 14 and 16, the trigger levels of the circuit are independent of variations in the supply voltage and the component tolerances are noncritical.

While for many applications it is desirable that the output signal change each time the input signal crosses the zero-volt axis, there are many applications wherein it is desirable that such a change occur only when the input signal is above or below a certain voltage amplitude. The circuit shown in FIG. 1 is easily converted into a circuit for indicating other than zero-crossings. This conversion is accomplished by connecting the emitters of transistors 26 and 38 to sources of potential rather than to ground.

Referring then to FIG. 2, there is shown one manner in which the emitters of transistors 26 and 38 can be biased in order that the two dual-transistor circuits will trigger at other than zero volts. In FIG. 2, the emitter junction of transistor 26 is shown to be connected to a Zener diode 48 which receives its biasing from a source of positive potential $+V_1$ through a resistor 50. It is also shown that the emitter junction of transistor 38 is connected to a Zener diode 52 which is biased by a source of negative potential $-V_2$ through a biasing resistor 54. By providing transistors 26 and 38 with Zener diodes 48 and 52, respectively, the triggering levels of the subject trigger circuit change from zero volts to the reference voltages generated by the Zener diodes. More particularly, if the voltage appearing across Zener diode 48 is $\pm V_1$ volts and the voltage appearing across Zener diode 52 is $-V_2$ volts then the signal appearing at the output terminal of the trigger circuit will remain at $+V$ volts until the input signal reaches $V_1$ volts at which time the output voltage will drop to $+V_1$ volts. That is, when the input signal reaches $+V_1$ volts, transistors 26 and 28 switch to their conductive states causing the signal appearing at the output terminal 30 to drop from V volts to $+V_1$ volts. When the input signal drops below $V_1$ volts, transistors 26 and 28 remain latched on until the feedback path therebetween is broken by the action of transistors 38 and 40. Transistors 38 and 40 become conductive, overriding the feedback path between transistors 26 and 28, when the incoming signal drops to $-V_2$ volts. At this time, the signal appearing at the output terminal 30 increases to V volts. It should therefore be apparent that by incorporating that portion of the trigger circuit shown in FIG. 2 into the circuit of FIG. 1 there results a circuit which is capable of discriminating and reacting to input signals only when the amplitude of any particular input signal reaches a level higher than a predetermined value dictated by a voltage bias placed on the emitter junction of transistor 26.

In conclusion, there has been disclosed a trigger circuit capable of issuing an output signal in response to an input signal, the circuit functioning in such a manner that component tolerances are noncritical and the triggering levels are not dependent upon variations in the supply voltage. The circuit hereinabove disclosed is capable of functioning as a zero-crossing detecting circuit, as a circuit for converting a sinusoidal wave input into a square wave output, or a circuit for detecting input signals above a predetermined amplitude level.

It is to be understood that the embodiments disclosed above are for illustrative purposes only and that there are many alterations and modifications, obvious to those skilled in the art, which can be performed without departing from the spirit and the scope of the invention. It is therefore important that the instant invention not be limited to the embodiments described above but be limited only as defined in the appended claims.

I claim:
1. A latching threshold detector adapted to be connected to a source of periodically varying input voltage signal and comprising:
  an output terminal at which appears an output signal which is latched to a first voltage level when said input voltage signal is of a first predetermined threshold level and which is latched to a second voltage level at such time as said incoming signal is of a second predetermined threshold level;
  a source of supply voltage;
  a first semiconductor device comprising:
    a control electrode connected to receive said input voltage signal, and
    a pair of primary current-conducting electrodes, one of said primary electrodes being connected to said output terminal and to said supply voltage source and the other of said primary electrodes being connected to ground,
    the signal appearing at said output terminal being at said first voltage level when said first semiconductor device is in its conductive state;
  a second semiconductor device whose conduction state is determined by and corresponds to the conduction state of said first semiconductor device and comprising:
    a control electrode connected to one of said primary current conducting electrodes of said first semiconductor device, and
    a pair of primary current-conducting electrodes, one of said primary electrodes being connected in a feedback path to said control electrode of said first semiconductor device, said feedback path maintaining said first semiconductor device in its conductive state, thereby causing said output signal to be latched to said first voltage level, the other of said primary electrodes being connected to said supply voltage;
  a third semiconductor device of opposite conductivity type as said first semiconductor device and comprising:
    a pair of primary conducting electrodes, one of said primary electrodes being connected to ground, and
    a control electrode connected to receive said input voltage signal,
  a fourth semiconductor device whose conduction state is determined by and corresponds to the conduction state of said third semiconductor device, and comprising:
    a control electrode connected to the other of said primary conducting electrodes of said third semiconductor device and,
    a pair of primary current-conducting electrodes, one of said primary electrodes being connected to said feedback path for destroying the ability of said feedback path to maintain said first semiconductor device in its conductive state when said fourth semiconductor device is in its conductive state thereby causing said output signal to be latched to said second voltage level, and the other of said primary electrodes being connected to said supply voltage;
  the signal appearing at said output terminal being at said second voltage level when third semiconductor device is in its conductive state.

2. A latching threshold detector as claimed in claim 1 wherein said semiconductor devices are transistors, said control electrodes of said semiconductor devices are bases, and said pair of primary current-conducting electrodes of said semiconductor devices are emitters and collectors.

3. The trigger circuit of claim 2 and further comprising
  first emitter follower transistor means for receiving said incoming signal and for transmitting to said first transistor means a signal in response to said incoming signal; and
  second emitter follower transistor means for receiving said incoming signal and for transmitting to said third transistor means a signal in response to said incoming signal.

4. The circuit of claim 3 and further comprising
  first biasing means associated with said first transistor means for setting the upper trigger level of the trigger circuit; and
  second biasing means associated with said third transistor means for setting the lower trigger level of the trigger circuit.

5. A trigger circuit for receiving an incoming signal and for issuing an output signal in response thereto, the output signal being of such a nature that it indicates whether the input signal meets a predetermined amplitude requirement, and comprising
  an input terminal for receiving an incoming signal;
  an output terminal for issuing a signal having either a first or a second voltage level;
  a source of positive and negative control voltage;
  a first transistor having a collector, an emitter and a base,
    the base being connected to said input terminal, and
    the collector forming said output terminal;
    the emitter being connected to ground;
  a second transistor of opposite conductivity type from said first transistor having a collector, an emitter and a base,
    said base of said second transistor being connected to said collector of said first transistor thereby causing said first transistor to control the conduction state of said second transistor, said first and said second transistors always being in the same conduction state, said emitter being connected to said source of positive control voltage and
    said collector of said second transistor being connected to both said input terminal and to said base of said first transistor, said collector-base connection causing a feedback path to be provided between said second and said first transistors, said second transistor having the capability of latching said first transistor in its conductive state;

a third transistor of opposite conductivity type from said first transistor and in the conduction state opposite from that experienced by said first transistor, and having a collector, an emitter and a base,
   said base being connected to said input terminal,
   said emitter being connected to ground, and
   said collector being connected to said source of negative control a fourth transistor having a collector, an emitter and a base,
   said base of said fourth transistor being connected to said collector of said third transistor thereby causing said third transistor to control the conduction state of said fourth transistor, said third and said fourth transistors always being in the same conduction state,
   said collector being connected to said feedback path destroying the ability of said feedback path to maintain said first semiconductor device in its conductive state when said fourth transistor is in its conductive state,
   said emitter being connected to said source of negative control voltage.

6. The trigger circuit as claimed in claim 5 and further comprising
   first biasing means connected to the emitter of said first transistor for determining the upper trigger level of the circuit; and
   second biasing means connected to the emitter of said third transistor for determining the lower trigger level of the circuit.

7. The circuit of claim 6 wherein
   the collector of said fourth transistor is connected to the base of said first transistor and the collector of said second transistor in such a manner that when said fourth transistor is in its conductive state, current is not allowed to flow from the collector of said second transistor into the base of said first transistor.

8. The trigger circuit of claim 7 and further comprising
   first emitter follower means for receiving said incoming signal and for transmitting to said first transistor a signal in response to said incoming signal; and
   second emitter follower means for receiving said incoming signal and for transmitting to said third transistor a signal in response to said incoming signal.